D. BARNUM.

SEWING MACHINE GUIDE.

No. 1,760. Reissued Sept. 13, 1864.

Witnesses.

O. J. Barnum

E. G. Barnum

Inventor.

Daniel Barnum

UNITED STATES PATENT OFFICE.

DANIEL BARNUM, OF NEW YORK, N. Y.

IMPROVEMENT IN SEWING-MACHINE GUIDES.

Specification forming part of Letters Patent No. 362, dated February 12, 1861; Reissue No. 1,760, dated September 13, 1864.

*To all whom it may concern:*

Be it known that I, DANIEL BARNUM, of the city, county, and State of New York, have invented a new and useful improvement for automatically maintaining a smooth surface and guiding soft flexible material to a sewing-machine needle for sewing seams, tucks, hems, &c., which I denominate a "self-sewer" or "automatic guide" for sewing-machines; and I do hereby declare the following to be a full and clear description of the same, reference being had to the drawings, and to the letters of reference thereon, which make part of this specification.

Figure 1:
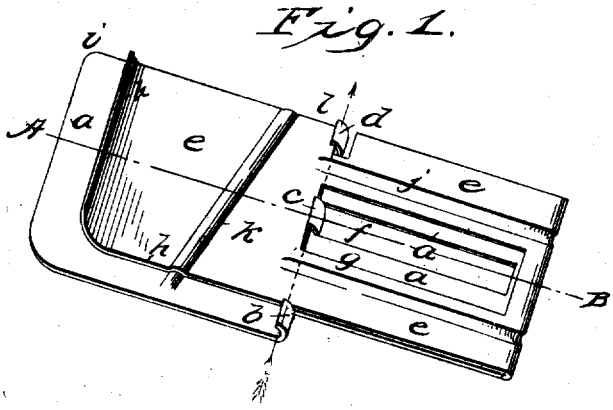
Figure 2:
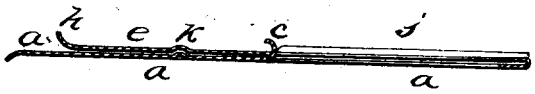

Figure 1 is a perspective plan view, exhibiting the improvement as of one piece of thin spring sheet metal. Fig. 2 is a section through the line A B.

It is well known that in sewing light and fragile textures and fine goods with the ordinary sewing-machine gage it requires great care, even with skilled operators, to keep the surface of the material smooth and prevent the same from doubling or crimping up between the needle and the gage, as well as outside of and around the needle, and thus to secure straight seams and even widths of tucks, hems, &c., and especially is this the case with the unskillful and inexperienced. My improvements are intended to obviate all these difficulties, and to enable ladies of limited experience to use their sewing-machines with satisfactory results to themselves, and to do away with the necessity for the close application and watchfulness heretofore so painful to the eyes and hurtful to the backs and limbs of many who have taken great delight in using the sewing-machine, but who have found it thus injurious and hurtful under close application.

The nature of my invention consists in making automatic spring clamping-surfaces of thin or light elastic sheet metal and combining them with a sewing-machine gage outside of the gaging-line and needle, and thereby producing an automatic spring-gage for sewing seams, tucks, hems, &c., and by which automatic spring-like action a gentle self-adapting pressure is applied to the upper surface of the material to be sewed, making the same level and even as it approaches the needle, both outside of and around the needle, as well as between it and the gage, whereby the surface is made smooth and held (without basting) so as to prevent its doubling up or crimping or rising over the gage, and thereby insuring straight and even seams, tucks, &c. The spring metal must be so light and elastic that the clamping-surfaces will readily yield to any irregularities (whether they arise from increased thicknesses of material or from sewing over seams) and permit the same to pass freely under the clamping-surfaces without materially changing the clamping-power or interfering with the feeding apparatus. It will readily be seen that this easy range of motion and delicacy of spring-pressure can only be obtained from very light elastic metal.

My invention also consists in the use of thin sheet metal for the clamping-surfaces, in combination with turning or striking the thin edges of the said clamping-surfaces up, and thus to form inclined surfaces to facilitate an easy entrance of the material under the clamping-surfaces, whether of even thicknesses or of unequal surfaces, whereby seams and other inequalities pass freely through the machine, while the clamping-surfaces adapt themselves thereto readily.

My invention also consists in striking up in thin metal clamping-surfaces, and in combination, diagonal corrugations outside of an automatic clamping spring gage-line and needle, as well as in combination therewith, whereby the material is automatically inclined as it moves between the clamping-surfaces toward and against the gage, and thus constituting it an automatic self-guiding gage for sewing-machines.

To enable others to make and use my invention, I refer to the drawings, and to the letters of reference marked thereon, and which show all the various parts to be constructed from one piece of elastic thin sheet metal, with the gaging-lips cut out from the under side or lower spring-clamp, with the fastening and adjusting slot surrounded by an enlarged slot in the upper clamp-spring, this enlarged slot being designed to give entire freedom to the upper spring by its working around the fastening-screw.

*a* is the under clamping-spring, forming the bed-piece of the gage.

*b*, *c*, and *d* represent three gaging-lips cut out and turned up from *a* through slots cut in the upper clamping-spring, *e*, so as to form gages or a gage for the material to run against, as well as stops to prevent *e* from opening far enough from *a* to bend the metal of the springs. I sometimes make but two of these gaging-lips, as the number is not very material.

*f* is the fastening and adjusting slot in *a*, and *g* is the enlarged slot in *e*.

*h* shows the front edge of the upper spring-clamp turned up, which strengthens the spring and presents a beveled surface to the advancing material for facilitating the entrance of unequal surfaces into or between the clamps, and for this purpose, also, the projections of *a* are deflected downward from the gaging-lip *b* around to the corner *i*, and thus presenting reverse bevel-surfaces and forming inclined planes, between which the material finds an easy entrance within the clamps.

*j* shows a male and female corrugation in both *a* and *e*. These serve to give strength to the springs and enable me to use very thin sheet metal, and by that means to secure the utmost delicacy of pressure and range of motion and elasticity—a point necessary to the success of the improvement, but which is not attainable with thick metal.

At *k* is seen a male and female diagonal corrugation, stamped or pressed into and across both the upper and under clamping spring surfaces, which, in combination with the gaging-lips and thin elastic sheet-metal springs, constitute male and female clamping spring gages for automatically guiding and sewing straight seams, tucks, hems, &c. The corrugations should be stamped up from the under side. This will leave a level surface on the under side, so as to fit the machine, and at the same time the upper side may be beautified with beads formed by the corrugations. The diagonal male and female corrugations should be made within an angle of forty-five degrees with the line of the gaging-lips. This angle may be varied without materially changing the result.

It will of course be understood that the material is to be fed into the clamping surfaces through the inclined planes, when the male and female diagonal clamps will incline the same automatically toward the gaging-lips and deliver the portion to be sewed to the needle correctly, the gage being so placed that the needle or pressure pad comes just up to the delivering side of the gage. (Seen at *l*.)

It will be obvious that the gage may be made of two pieces riveted together, and that the lips may be made of pins or studs and attached to the under plate, *a*, and that the form may be varied, as well as the number of corrugations, without materially changing the principle of my invention.

It will be obvious, also, that the delicacy of spring and range or extent of motion required to accommodate varying thicknesses and uneven surfaces cannot be attained with thick or rigid metal springs; nor can the use of a set-screw to adjust the pressure of a rigid clamping-surface attain the end secured by the automatic spring clamping-surfaces of thin sheet metal, hereinbefore fully described; and in view of the facts above set forth, I remark that while these important results are produced by the use of thin spring metal alone, a further advantage is realized from such use in the facility of manufacture, as well as in the cost of construction which it affords, compared with any or all other forms of sewing-gages.

Having thus fully described my invention, and shown some of the modes of applying, constructing, and using the same, I remark that I do not claim to have invented diagonal clamps merely as such; nor do I claim the use of thin sheet metal, except as for the purposes herein set forth and claimed as new, in forming automatic clamping-surfaces outside of the needle and gage, and in the combinations specified, as and for the purposes specified.

What I do claim as new and of my own invention, and which I desire to secure by Letters Patent of the United States, is as follows, to wit:

1. The use of thin sheet or light elastic spring metal for making automatic clamping-surfaces, extending out from the gaging-line of a sewing-machine gage, and in combination therewith, beyond the line of seam to be sewed by a needle, and of thus producing a gentle automatic spring-pressure upon the upper surface of flexible material while the same is approaching the needle, and thereby automatically smoothing and holding the said material preparatory to its being sewed outside of the line of the seam, as well as between it and the line of the gage, substantially as and for the purposes specified.

2. The use of thin sheet or light elastic spring metal for making automatic clamping spring surfaces, as specified, in combination with diagonal corrugations struck up thereon outside of the line of the seam to be sewed by a sewing-machine needle, substantially as and for the purposes specified.

3. The use of thin sheet or light elastic spring metal for making automatic clamping-surfaces, as specified, in combination with the inclined plane or beveled edges, which are turned or struck up, as described, to facilitate an easy entrance of varying thicknesses and uneven surfaces of material under the upper clamping-surface, substantially as and for the purposes specified.

DANIEL BARNUM.

Witnesses:
E. A. McDermut,
C. Barnum.